(12) United States Patent
Soucek et al.

(10) Patent No.: US 7,967,315 B2
(45) Date of Patent: Jun. 28, 2011

(54) AIRFOIL SHAPE FOR BICYCLE

(75) Inventors: Jeffrey A. Soucek, Aliso Viejo, CA (US); David Tyson Buckenberger, Irvine, CA (US)

(73) Assignee: Felt Racing, LLC, Irvine, CA (US)

( * ) Notice: Subject to any disclaimer, the term of this patent is extended or adjusted under 35 U.S.C. 154(b) by 177 days.

(21) Appl. No.: 12/417,354

(22) Filed: Apr. 2, 2009

(65) Prior Publication Data

US 2010/0253038 A1    Oct. 7, 2010

(51) Int. Cl.
*B62K 19/02* (2006.01)
*B62K 21/02* (2006.01)
(52) U.S. Cl. ........................... 280/274; 280/279
(58) Field of Classification Search ............ 280/281.1, 280/274, 279, 288
See application file for complete search history.

(56) References Cited

U.S. PATENT DOCUMENTS

| | | | | |
|---|---|---|---|---|
| 4,982,975 A | * | 1/1991 | Trimble | 280/281.1 |
| 5,221,102 A | * | 6/1993 | Spangler | 280/281.1 |
| 6,889,992 B2 | * | 5/2005 | Vroomen et al. | 280/274 |
| 7,147,237 B2 | * | 12/2006 | Cobb | 280/279 |
| 2010/0225090 A1 | * | 9/2010 | Cusack et al. | 280/281.1 |

OTHER PUBLICATIONS

Dreese, John; "The Dreese Airfoil Primer"; Parts 1-5.
"NACA Air Foil"; Wikipedia article; http://en.wikipedia.org/wiki/NACA_airfoil.

* cited by examiner

*Primary Examiner* — Tony H. Winner
(74) *Attorney, Agent, or Firm* — Stetina Brunda Garred & Brucker

(57) ABSTRACT

The bicycle may have a frame and a front fork. A cross section of the frame or the front fork may have an airfoil shape wherein a leading surface is sharper (i.e. less round) compared to prior art airfoil shaped bicycle front forks and bicycle frames. Additionally, a maximum thickness of the airfoil shape may be located more rearward compared to prior art airfoil shaped bicycle frames and bicycle front forks. This configuration provides for a reduction in drag for headwind speeds of about twenty (20) to thirty (30) miles per hour and headwind angles of plus or minus fifteen (15) degrees.

15 Claims, 3 Drawing Sheets

AIRFOIL SHAPE FOR BICYCLE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to an aerodynamically shaped bicycle.

Competition bicycle riding is performed both indoors and outdoors. In indoor bicycle competitions, the cyclists ride on an oval shaped track. There is little to no movement of air within the competition arena. When the cyclist is pedaling forward, the cyclist encounters drag as a function of the cyclist moving through the still air. The relative direction of the air to the cyclist is generally head on. As such, the aerodynamic shape of the bicycle is optimized assuming that air is directed head on to the bicycle. To this end, in an effort to reduce drag, engineers have designed bicycles having an airfoil shape. The airfoil shape promotes laminar flow of air over the bicycle frame and fork which aids in the reduction of drag. Generally, these airfoil shapes are similar to airplane wings, specifically, a round front with a pointed rear.

In outdoor competition racing, the cyclist may ride in windy conditions. The wind may blow in any direction three-hundred-sixty degrees (360°) about the cyclist. Accordingly, the angle of attack between the cyclist and the wind may vary. The cyclist experiences uncontrollable wind forces at varying angles. Nonetheless, engineers design the aerodynamic shape of the bicycle to be similar to airplane wings, specifically, a round front with a pointed rear.

For the foregoing reasons, there is a need in the art for an improved outdoor competition racing bicycle that is aerodynamically shaped for changing wind conditions.

BRIEF SUMMARY

The aerodynamically shaped bicycle discussed herein addresses the deficiencies above, deficiencies below and those that are known in the art.

The aerodynamically shaped bicycle may have a front fork, frame and seat posts in which one or more cross sections have an airfoil shape. The airfoil shape may generally have a less round leading surface compared to prior art airfoil shaped bicycles known in the art. Additionally, the maximum thickness of the airfoil shape may be located at approximately greater than about thirty percent (30%) to about sixty percent (60%) of the chordline, measured from a leading point of the airfoil shape.

Additionally, the ratio between the chord length and the maximum thickness of the airfoil shape may be 2:1 to 4:1. Preferably, the ratio between the chord length and the maximum thickness is 3:1 to 4:1.

The airfoil shape of the bicycle discussed herein provides for a reduction in drag when wind travels across the bicycle at about twenty (20) to thirty (30) miles per hour with a head-wind angle of plus (+) or minus (−) fifteen (15) degrees. The airfoil shape attempts to increase the amount of laminar flow of air that traverses across the bicycle. The generally sharper (i.e., less round) leading surface and the rearward location of the maximum thickness of the airfoil shape encourages laminar flow of air for a longer duration across the bicycle part.

Modifications to the airfoil shape may be made at different locations or cross sections of the bicycle frame and fork. By way of example and not limitation, the seat tube, which is located directly in front of the rear wheel, may have a cutout section with left and right bulbous rear portions that encourage the wind or air to flow past the rear tire and wheel instead of being trapped between the seat tube and the rear wheel. More particularly, as the wind approaches the seat tube, wind flows past opposed sides of the seat tube. The wind eventually contacts the left and right rear bulbous portions that deflect the air away from the rear wheel. The frontal portion of the seat tube promotes or encourages laminar flow of air, whereas the rear portion of the seat tube mitigates air from entering between the seat tube and the rear wheel which may increase drag.

The head tube of the bicycle frame may be blended in with a fork head of the fork such that a cross section of the fork head and head tube collectively form an airfoil shape as discussed herein. Preferably, the fork head pivots about the head tube about the head tube's central rotating axis. Left and right rear corners of the fork head may be blended with the left and right surfaces of the head tube. This encourages laminar of flow of air past the fork head/head tube combination as the rider turns left and right.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
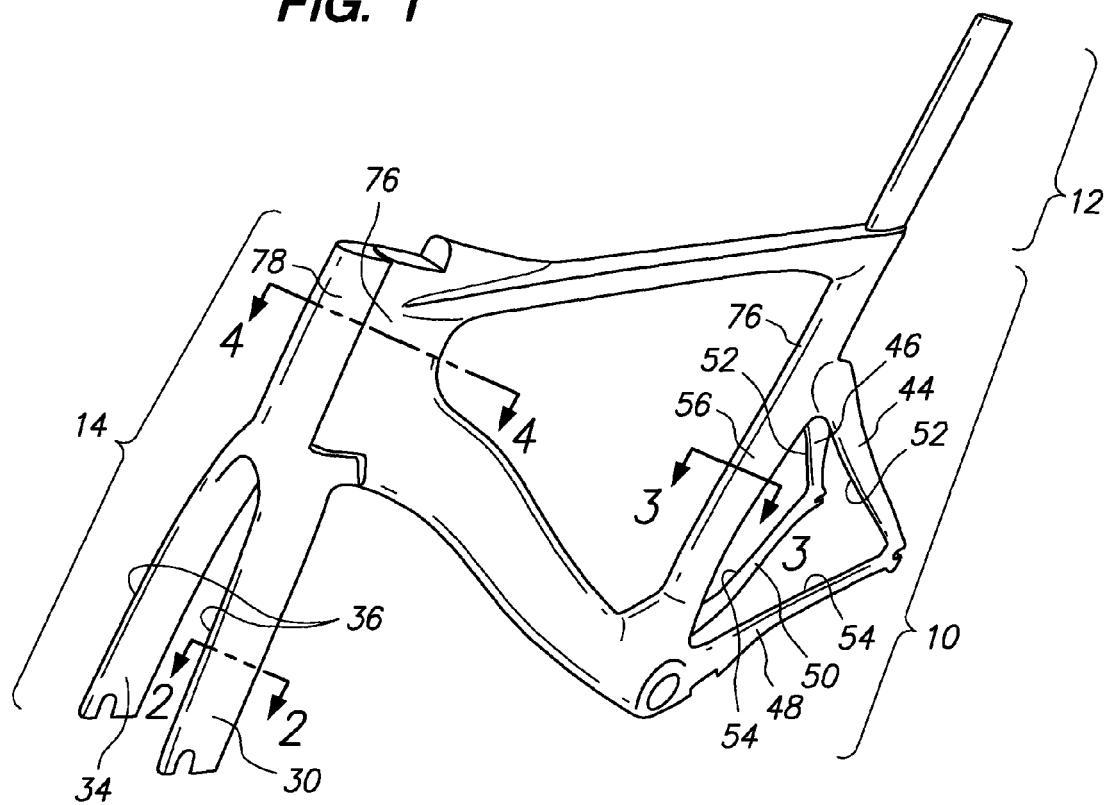
FIG. 1 is a perspective view of a bicycle frame and front fork having an airfoil shape.

Referring now to FIG. 1, a perspective view of a bicycle frame 10, seat post 12 and front fork 14 is shown. FIGS. 2-4A illustrate various cross sections of the frame 10 and the front fork 14 having an air foil shape. As shown in FIGS. 2-4A, the leading point 16 of the cross section is generally sharper than prior art bicycles having an airfoil shaped frame (see FIG. 5), airfoil shaped seat post, and/or airfoil shaped front fork. Also, the location 18 of a maximum thickness 20 of the airfoil shape part is generally located further behind the leading point 16 compared to other prior art bicycles having an airfoil shape, as shown by comparison of FIGS. 2-4A with prior art FIG. 5. The left surface 22 and the right surface 24 of the airfoil shaped part may be symmetrical about a chordline 26. This unique airfoil shape as applied to outdoor competition bicycles provide for a reduction in drag coefficient while the rider experiences a headwind speed of approximately 20-30 miles per hour at a headwind angle 28 (see FIG. 2) of approximately 15 degrees. The airfoil shape discussed herein may have (1) zero (0) camber, (2) a sharper (i.e., less round) front surface compared to prior art airfoil shapes for bicycles and (3) the thickest portion of the airfoil shape located more rearwardly compared to prior art airfoil shapes for bicycles.

The generic shape of an airfoil is round in the front and sharp in the back. A straight line that extends from a leading point 16 to a trailing point 32 of the airfoil shape defines the chordline 26. When the chordline 26 is parallel with a direction of wind, the airfoil shape is said to have an angle of attack to the wind direction of zero degrees (0°). Air travels over both sides of the airfoil shape at the same speed. When the oncoming wind or air 74 changes direction, the angle between the chordline 26 and the direction of the oncoming wind defines an angle of attack. Typically, in prior art airplane wings, as the angle of attack increases, lift and drag are produced. Airplane wings attempt to maximize lift while minimizing drag. Since the bicycle is not concerned with lift, the airfoil shape is optimized to reduce drag only. To this end, the airfoil shape promotes laminar flow of air across the airfoil shape.

Ideally, the oncoming air initially contacts the leading edge 36 of the bicycle part. Theoretically, the air stops. From the leading edge 36, a boundary layer grows laminarly over the opposed surfaces of the bicycle part. The forward portion of the airfoil shape accelerates the air and preserves the laminar flow of air. However, when the air begins to decelerate, the laminar flow of air transitions to a more turbulent flow of air increasing the drag. In the improved airfoil shape for bicycle, by moving the location 18 of the maximum thickness 20 of the airfoil shape rearward and forming the leading surface to be less round, the laminar portion of the airflow is increased. This improves the drag coefficient for an angle of attack of zero (0) degrees. Unexpectedly, this further improves the drag coefficient for angles of attack other than zero (0) degrees with respect to the bicycle as a whole.

Figure 2:
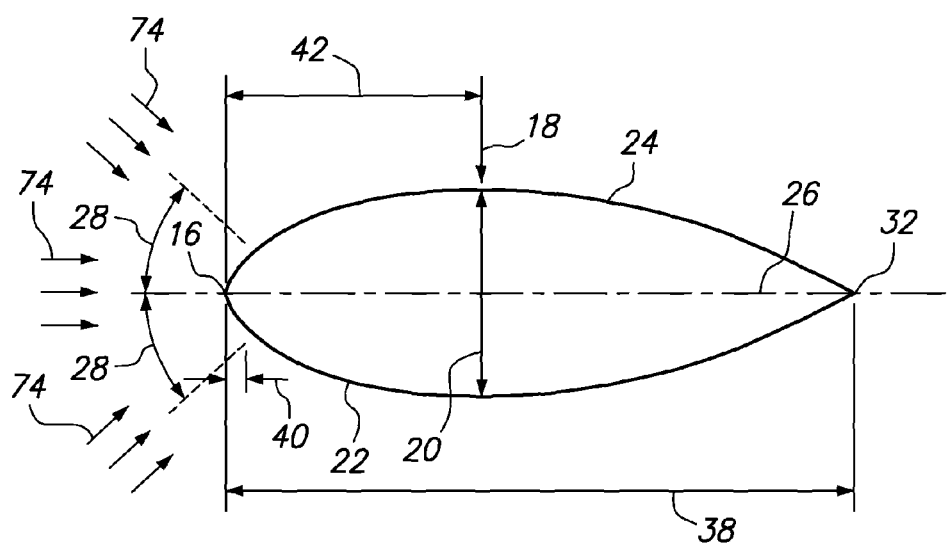
FIG. 2 is a cross sectional view of a left blade of a front fork shown in FIG. 1.

FIG. 2 is a cross sectional view of a left blade 30 (see FIG. 1) of the front fork 14. The chordline 26 is a straight line drawn from the leading point 16 to the trailing point 32. The left blade 30 and the right blade 34 each define a leading edge 36 (see FIG. 1) which defines the leading point 16 (see FIG. 2). The cross section shown in FIG. 2 is taken normal to the leading edge 36 of the left blade 30. All cross sections discussed herein are taken normal to the leading edge of the part discussed. As shown in FIG. 2, the left surface 22 and the right surface 24 are symmetrical about the chordline 26. The cross section also defines a length 38 of the chordline 26 or distance between the leading point 16 and the trailing point 32.

The leading surface 40 may have an arc shape. By way of example and not limitation, the leading surface 40 may have a cylindrical shape. The National Advisory Committee for Aeronautics (hereinafter "NACA") has developed a numbering system that identifies the major characteristics of an airfoil shape. The NACA numbering system may include four (4) digits (i.e., xxxx) which the first two digits define the camber angle (i.e., xxxx) and the last two digits define a maximum thickness (i.e., xxxx) of the airfoil shape as a percentage of a chord length of the airfoil shape. The NACA numbering system may be followed by a dash (−) with two (2) numbers. The first (i.e., xxxx-xx) of the two numbers following the dash (−) indicates the roundness of the leading surface 40 and may be represented by the letter "I". A value of six (6) indicates that the leading surface 40 has a radius similar to a typical airfoil shape while a value of zero (0) indicates a sharp leading edge. The typical airfoil shape has a round (i.e., circular or arc) leading surface 40 approximated by the following equation, $r=1.1019 \times (I \times t/6)^2$ wherein "t" is the maximum thickness of the airfoil shape as a fraction of the chord length and "I" is equal to 6. This "r" value represents a NACA numbering system xxxx-6x. The roundness of the leading surface 40 discussed herein for the improved airfoil shape for bicycle may be in a range between xxxx-1x to xxxx-5x. Preferably, based on the NACA standard, the roundness of the leading surface 40 is about xxxx-3x. The radius of the leading surface for the NACA numbering system xxxx-3x is equal to $r=1.1019 \times (3 \times t/6)^2$.

In another aspect of the cross section, the maximum thickness 20 may be located at a position 18 approximately forty percent (40%) behind the leading point 16. The location 18 is defined by a distance 42 from the leading point 16 divided by the overall length 38 of the chordline 26 multiplied by one-hundred (100) to obtain the location 18 in terms of a percentage of the length 38 of the chordline 26. The position 18 of the maximum thickness 20 may be located approximately forty percent (40%) of the length 32 of the chordline 26, but it is also contemplated that the maximum thickness 20 may be located at any percentage greater than about 30 percent to about 60 percent.

The left and right blades 30, 34 may have an identical configuration. However, it is also contemplated that the left and right blades 30, 34 of the front fork 14 may have a mirror configuration in the event that camber is added to the airfoil shape. In the event camber is added to the airfoil shape of the left and right blades 30, 34, the camber would be implemented in reverse. By way of example and not limitation, if the left blade 30 is bowed out to the left, the right blade 34 would be bowed out to the right, and vice versa. Additionally, the airfoil shape discussed in relation to the left and right blades 30, 34 of the front fork 14 may also be applied to one or more of the left and right seat stays 44, 46, left and right chain stays 48, 50, down tube, seat tube 56 and seat post 12. The leading edge of the seat stays 44, 46 are identified as reference numeral 52. The leading edge for the left and right chain stays 48, 50 is identified as reference numeral 54.

Figure 3:
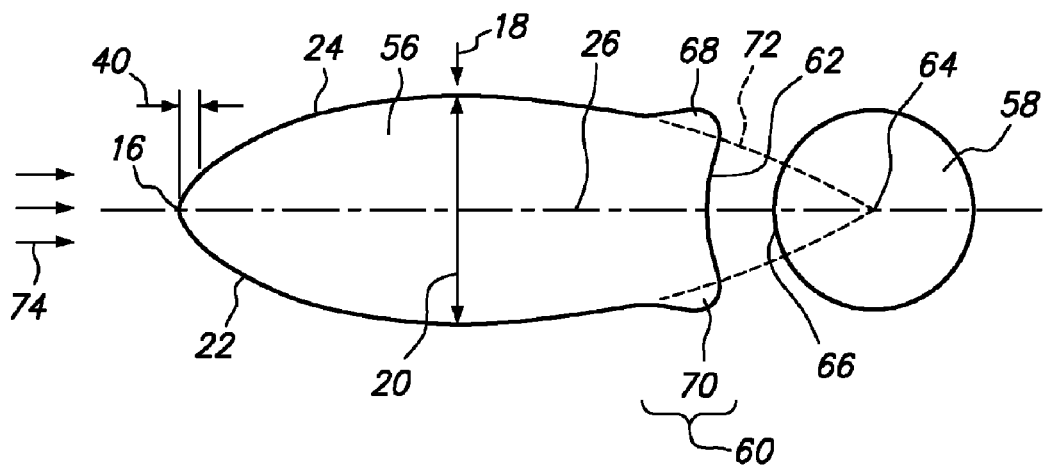
FIG. 3 is a cross sectional view of a seat tube of the bicycle frame shown in FIG. 1.

Referring now to FIG. 3, a modified airfoil shape of the seat tube 56 is shown. The leading surface 40 and the location 18 of the maximum thickness 20 may have the same characteristics as that described in relation to the left and right blades 30, 34, discussed above.

The seat tube 56 is directly in front of the rear wheel. A tire 58 of the rear wheel is shown in FIG. 3. The rear portion 60 of the seat tube 56 is cut away to allow room for the rear tire 58. A rear surface 62 of the seat tube has an arc shape, preferably circular defined as a radius from the center 64 of the rear tire 58. The rear surface 62 may be gapped equidistantly away from a front surface 66 of the rear tire 58. The rear portion 60 of the seat tube 56 may additionally have left and right protuberances 68, 70 which extend out of the normal profile 72 (shown in dash) of the airfoil shape. Preferably, the left and right protuberances 68, 70 are blended with the left surface 22, right surface 24 and the rear surface 62 to promote laminar flow of air or less turbulent flow of air.

During operation, air 74 approaches the leading edge 76 (see FIG. 1) of the seat tube 56. The air 74 is divided into generally two portions. The first portion flows adjacent the left surface 22 and the second portion flows adjacent the right surface 24. As the first and second portions of the air 74 approach the rear tire 58, the air 74 flows over the left and right protuberances 68, 70 to provide a generally turbulent flow over the left and right sides of the tire 58. The left and right protuberances 68, 70 deflect the air 74 away from the tire 58. If the rear portion 60 did not incorporate the protuberances 68, 70 but rather followed the normal profile 72 shown in dash lines, then the air 74 may be funneled between the rear surface 62 and the front surface 66 and may cause greater friction against the rear tire 58 and drag.

Figure 4:
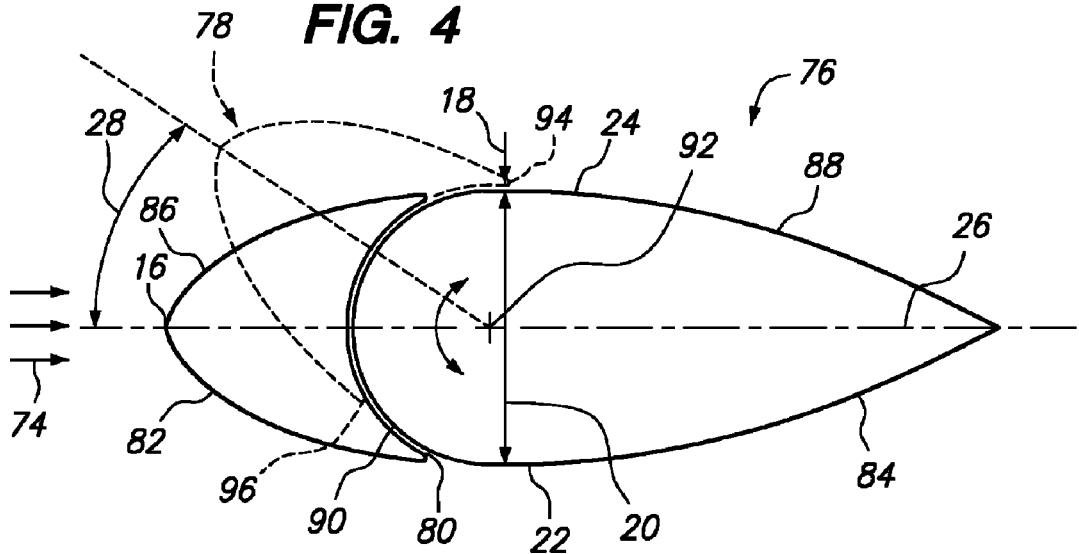
FIG. 4 is a cross sectional view of a head tube of the bicycle frame shown in FIG. 1.
Figure 5:
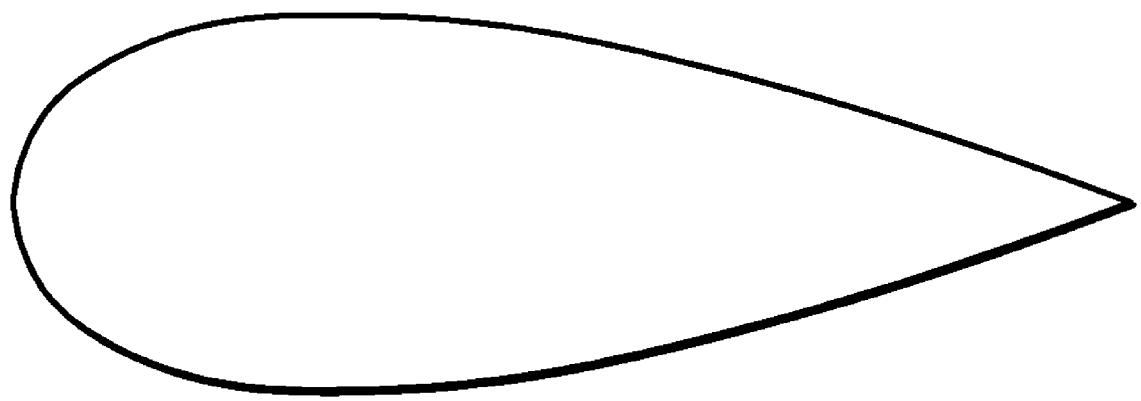
FIG. 5 is a cross sectional view of a prior art bicycle frame.

Referring now to FIG. 4, a cross section of the head tube 76 is shown. The fork 14 may also have a fork head 78 that pivots about the head tube 76. The front fork 14 may be attached to the head tube 76 as discussed in U.S. patent application Ser. No. 11/595,205, now U.S. Pat. No. 7,571,920, filed on Nov. 10, 2006, the entire contents of which is expressly incorporated herein by reference. The fork head 78 and the head tube 76 collectively define an airfoil shape as described in relation to the blade 30 of the fork 14. There may be a small gap 80 between the fork head 78 and the head tube 76. The left surface 82 of the fork head 78 may blend smoothly with the left surface 84 of the head tube 76 to encourage laminar flow of air 74. Likewise, the right surface 86 of the fork head may blend smoothly with the right surface 88 of the head tube 76 to encourage laminar flow of air. The front surface 90 of the head tube 76 may have an arc shape, preferably circular. The front surface 90 preferably has a radius from a rotational axis 92 of the front fork 14. When the front fork 14 is rotated to the left, the right rear corner 94 of the fork head 78 maintains the gap 80 to the front surface 90 of the head tube 76. Likewise, as shown in FIG. 4 in dash line, when the fork 14 is rotated to the right, the left rear corner 96 of the fork head 78 maintains the gap 80 from the front surface 90 of the head tube 76. As such, laminar flow of air is encouraged as wind passes by the fork head 78 and the head tube 76.

Figure 4A:
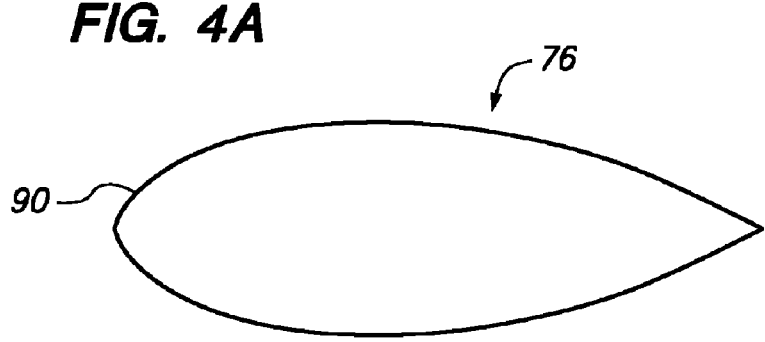
FIG. 4A is a cross sectional view of a conventional head tube with an airfoil shape.

It is also contemplated that the airfoil shape may be incorporated into a conventional head tube 76, as shown in FIG. 4A. In this example, the fork head 78 is not disposed in front of the head tube 76. Rather, the front surface 90 of the head tube 76 is exposed to the oncoming flow of air. It is also contemplated that other parts or sections of the bicycle such as the seat post 12 may have a cross section having an airfoil shape as discussed in relation to the blade 30 of the front fork 14.

In another aspect of the airfoil shape, the same may have a chord length 26 to maximum thickness 20 ratio in the range from 2:1 to 4:1. Preferably, the chord length 26 to maximum thickness 20 ratio is 3:1 to 4:1. The chord length 26 to maximum thickness 20 ratio is identified by the last two (2) numbers of the first four (4) numbers in the six (6) digit NACA numbering system. For example, the chord length 26 to maximum thickness 20 ratio is defined by xxxx-xx. A 3:1 ratio would be represented by xx33-xx. A 4:1 $\overline{\text{ratio}}$ would be represented by xx25-xx. The "33" and "25" Fnumber represents the maximum thickness 20 as a percentage of the chord length 38. For the airfoil shape discussed herein, the chord length 38 to maximum thickness 20 may be 2:1 to 4:1, and preferably is 3:1 to 4:1.

During use, the bicycle will be used for outdoor racing competitions. The cyclist and bicycle will be subjected to wind at various headwind angles throughout the duration of the race. As shown in FIG. 2, the wind 74 may approach the airfoil shape of the front fork 14 and bicycle frame 10 head on. At other times, the wind 74 may approach the airfoil shape of the bicycle frame 10 and front fork 14 at a headwind angle 28 other than head on. As the headwind angle 28 increases from zero (0) to fifteen (15) degrees, the drag coefficient of the bicycle having an airfoil shape applied to the blades 30, 34 of the fork 12, heat tube 76/fork head 78, down tube, seat tube 56, seat stays 44, 46, chain stays 48, 50 and the seat post 12 is unexpectedly lowered.

Moreover, as shown in FIG. 4, as the cyclist turns left and right, the fork head 78 also rotates in the left or right direction. If the cyclist is approaching the wind 74 head on as shown in FIG. 4 when riding straight ahead, the airfoil shape provides an improvement in the drag coefficient. As the rider turns to the right as shown in FIG. 4, the fork head 78 also is rotated to the right. In doing so, the smooth transition between the fork head 78 and the head tube 76 promotes laminar flow of air past the fork head 78/head tube 76 combination.

The above description is given by way of example, and not limitation. Given the above disclosure, one skilled in the art could devise variations that are within the scope and spirit of the invention disclosed herein, including various other frames, forks, etc. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A bicycle front fork comprising:
    left and right blades for mounting a bicycle wheel, the left and right blades being a mirror image and each having an airfoil shape, a location of a maximum thickness of the airfoil shape being about 30% to about 60% of a chord length of the airfoil measured from a leading point of the airfoil, a leading surface having a radius about $1.1019 \times (1 \times t/6)^2$ to about $1.1019 \times (5 \times t/6)^2$ wherein t is a maximum thickness of the airfoil shape as a fraction of the chord length.

2. The bicycle front fork of claim 1 wherein the air foil shape of the left and right blades is normal to the leading edge of the left and right blades.

3. The bicycle front fork of claim 1 wherein a ratio of chord length to maximum thickness is 2:1 to 4:1.

4. The bicycle front fork of claim 3 wherein the ratio is 3:1 to 4:1.

5. The bicycle front fork of claim 1 wherein the location of the maximum thickness of the airfoil shape is about 40% of the chord length measured from the leading point of the airfoil.

6. The bicycle front fork of claim 1 wherein the radius of the leading surface is about $1.1019 \times (3 \times t/6)^2$.

7. The bicycle front fork of claim 1 wherein the airfoil shape is symmetrical.

8. The bicycle front fork of claim 1 wherein the left and right blades have a minor configuration.

9. The bicycle front fork of claim 8 wherein the left and right blades are identical to each other.

10. A bicycle frame comprising:
    a plurality of members for mounting a bicycle wheel and a front fork;
    at least a portion of at least one of the plurality of members having continuously curved airfoil shape from a leading point of the airfoil to a rear side of the airfoil, a location of a maximum thickness of the airfoil shape being about 30% to about 60% of a chord length of the airfoil measured from the leading point of the airfoil, a leading surface having a radius about $1.1019 \times (1 \times t/6)^2$ to about $1.1019 \times (5 \times t/6)^2$ wherein t is a maximum thickness of the airfoil shape as a fraction of the chord length.

11. The bicycle frame of claim 10 wherein the at least one of the plurality of members is a seat tube having a cut out rear portion with left and right rear laterally protruding bulbous portions for deflecting air away from the rear wheel.

12. The bicycle frame of claim 10 wherein the member is one or more of a head tube, down tube, seat tube, seat stays, chain stays and seat post.

13. The bicycle frame of claim 10 wherein the plurality of members is a head tube, seat tube, seat stays, chain stays and seat post.

14. A bicycle frame comprising:
    a plurality of members for mounting a bicycle wheel and a front fork;

at least a portion of at least one of the plurality of members having an airfoil shape, a location of a maximum thickness of the airfoil shape being about 30% to about 60% of a chord length of the airfoil measured from a leading point of the airfoil, a leading surface having a radius about $1.1019 \times (1 \times t/6)^2$ to about $1.1019 \times (5 \times t/6)^2$ wherein t is a maximum thickness of the airfoil shape as a fraction of the chord length;

wherein the plurality of members is a combination fork head and head tube.

15. The bicycle frame of claim 14 wherein the left and right surfaces of the fork head blend with the left and right surfaces of the head tube to encourage laminar flow of air.

* * * * *